US009904326B2

(12) United States Patent
Lin et al.

(10) Patent No.: US 9,904,326 B2
(45) Date of Patent: Feb. 27, 2018

(54) WATERPROOF HOUSING AND ELECTRONIC DEVICE USING THE SAME

(71) Applicant: ASUSTeK COMPUTER INC., Taipei (TW)

(72) Inventors: Tsui-Wei Lin, Taipei (TW); Tang-Lung Lo, Taipei (TW); Ping-Yu Chen, Taipei (TW); Yen-Chih Chen, Taipei (TW); Po-Wen Huang, Taipei (TW); Chiu-Lang Huang, Taipei (TW); Ming-Chih Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/212,292

(22) Filed: Jul. 18, 2016

(65) Prior Publication Data

US 2017/0023983 A1    Jan. 26, 2017

(30) Foreign Application Priority Data

Jul. 21, 2015 (TW) .............................. 104123542 A

(51) Int. Cl.
*G06F 1/16* (2006.01)

(52) U.S. Cl.
CPC .......... *G06F 1/1656* (2013.01); *G06F 1/1662* (2013.01)

(58) Field of Classification Search
CPC .............................. G06F 1/1656; G06F 1/1662
See application file for complete search history.

(56) References Cited

U.S. PATENT DOCUMENTS 6,031,524 A * 2/2000 Kunert ................. G06F 3/0202
                                                          345/169
6,239,391 B1 * 5/2001 Nishijima .......... H01H 13/7006
                                                          200/302.2
(Continued)

FOREIGN PATENT DOCUMENTS

CN    102955573    3/2013
CN    103515130    1/2014
(Continued)

OTHER PUBLICATIONS

"Office Action of Taiwan Counterpart Application", dated Apr. 26, 2017, p. 1-p. 6.

*Primary Examiner* — Binh Tran
*Assistant Examiner* — Douglas Burtner
(74) *Attorney, Agent, or Firm* — JCIPRNET

(57) ABSTRACT

A waterproof housing including a frame structure and a waterproof structure is provided. The frame structure includes an opening. The waterproof structure is fixed on the frame structure and covers whole of the external surface and the opening of the frame structure. The waterproof structure includes a plurality of ribs extending toward the opening correspondingly and located in the opening. An electronic device is further provided including the waterproof housing and a keyboard module. The keyboard module includes a plurality of keys. The keyboard module is disposed under the waterproof housing and passes into the opening from an underside of the frame structure. The waterproof structure covers the keyboard module disposed in the opening and is fixed between the keys via the ribs. Therefore, the electronic device and the waterproof housing thereof have an improved water-proof function and are convenient in use.

6 Claims, 5 Drawing Sheets

(56) References Cited

U.S. PATENT DOCUMENTS

| | | | | |
|---|---|---|---|---|
| 6,542,355 B1* | 4/2003 | Huang | ................. | G06F 3/0202 |
| | | | | 312/223.2 |
| 6,971,807 B2 | 12/2005 | Tsai et al. | | |
| 2004/0226248 A1* | 11/2004 | Wu | ................. | G06F 1/1616 |
| | | | | 52/600 |
| 2005/0013645 A1 | 1/2005 | Tsai et al. | | |
| 2007/0025071 A1* | 2/2007 | Yokote | ................. | G06F 1/1616 |
| | | | | 361/679.08 |
| 2007/0025792 A1* | 2/2007 | Motoe | ................. | G06F 1/1616 |
| | | | | 400/472 |
| 2007/0199804 A1* | 8/2007 | Joseph | ................. | H01H 13/705 |
| | | | | 200/5 A |
| 2008/0150769 A1* | 6/2008 | Imamura | ................. | G06F 1/1616 |
| | | | | 341/34 |
| 2008/0296134 A1* | 12/2008 | Hattori | ................. | G06F 1/1616 |
| | | | | 200/302.1 |
| 2010/0091442 A1* | 4/2010 | Theobald | ................. | G06F 1/1616 |
| | | | | 361/679.09 |
| 2011/0162948 A1* | 7/2011 | Takagi | ................. | H01H 3/125 |
| | | | | 200/344 |
| 2011/0205700 A1* | 8/2011 | Chen | ................. | G06F 1/1662 |
| | | | | 361/679.09 |
| 2011/0292579 A1* | 12/2011 | Koga | ................. | G06F 1/1616 |
| | | | | 361/679.01 |
| 2011/0310553 A1* | 12/2011 | Hsiao | ................. | G06F 1/1616 |
| | | | | 361/679.55 |
| 2013/0043115 A1* | 2/2013 | Yang | ................. | G06F 1/1662 |
| | | | | 200/5 A |
| 2013/0270081 A1* | 10/2013 | Wu | ................. | H01H 13/14 |
| | | | | 200/314 |
| 2014/0254078 A1* | 9/2014 | Matsuoka | ................. | G06F 1/1675 |
| | | | | 361/679.09 |
| 2014/0355193 A1* | 12/2014 | Purcocks | ................. | G06F 1/1662 |
| | | | | 361/679.17 |
| 2015/0016039 A1* | 1/2015 | Oakley | ................. | G06F 1/1662 |
| | | | | 361/679.12 |

FOREIGN PATENT DOCUMENTS

| | | |
|---|---|---|
| TW | M243721 | 9/2004 |
| TW | M366715 | 10/2009 |
| TW | M399371 | 3/2011 |

* cited by examiner

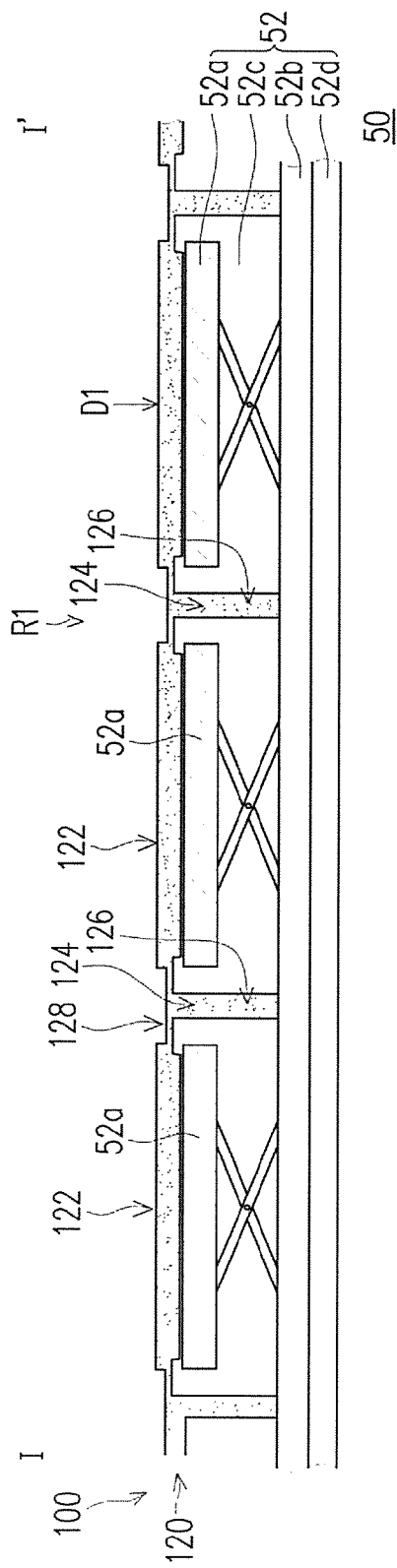
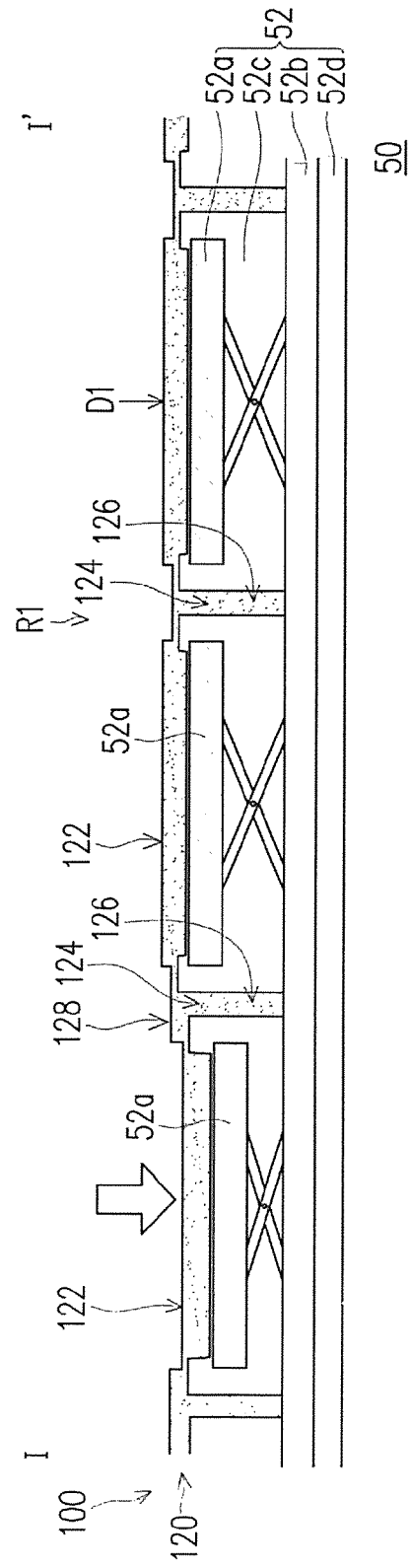
FIG.3A
FIG.3B

WATERPROOF HOUSING AND ELECTRONIC DEVICE USING THE SAME

CROSS-REFERENCE TO RELATED APPLICATION

This application claims the priority benefit of Taiwan application serial No. 104123542, filed on Jul. 21, 2015. The entirety of the above-mentioned patent application is hereby incorporated by references herein and made a part of specification.

BACKGROUND OF THE INVENTION

Field of the Invention

The disclosure relates to a housing and, more specifically, to a waterproof housing.

Description of the Related Art

With the development of technology industry, electronic devices such as a notebook, a tablet PC and a smart phone, are widely used in daily life. Generally, an electronic device includes a housing, a controller, a circuit board, a battery, an input/output interface (such as a display panel, a touch panel, a touchpad and a keyboard module) and other electronic components. The electronic components are accommodated between a top cover and a bottom cover of the housing.

Generally, the input/output interface (such as a keyboard module) is configured at top cover of an electronic device, and the input/output interface includes openings for accommodating keys of the keyboard module. A gap is therefore formed between the key and an edge of the opening of the top cover, thus the contaminants such as liquids or dust are easily fell into the electronic device and damages the electronic device.

BRIEF SUMMARY OF THE INVENTION

According to a first aspect, an electronic device including a waterproof housing and a keyboard module is provided. An electronic device, comprising a waterproof housing including a frame structure including an opening; and a waterproof structure configured to fix on the frame structure, and to cover whole of the external surface and the opening of the frame structure, wherein the waterproof structure includes a plurality of ribs extending toward the opening correspondingly and located in the opening; and a keyboard module including a plurality of keys, wherein the keyboard module is disposed under the waterproof housing and passes into the opening from an underside of the frame structure, the waterproof structure covers the keyboard module disposed in the opening and is fixed between the keys via the ribs.

According to a second aspect, a waterproof housing comprising a frame structure including an opening; and a waterproof structure configured to fix on the frame structure, and to cover whole of the external surface and the opening of the frame structure, wherein the waterproof structure includes a plurality of ribs extending toward the opening correspondingly and located in the opening.

In sum, as an outermost component of an electronic device, the waterproof housing in the disclosure prevents contaminates get into the electronic device. Moreover, the waterproof structure disclosed herein is integrated onto the electronic device, other waterproof components are thus saved. The configuration of the waterproof structure will not affect the operation to the keyboard module. Consequently, the electronic device with the waterproof housing provides users more convenience while using.

BRIEF DESCRIPTION OF THE DRAWINGS

These and other features, aspects and advantages of the disclosure will become better understood with regard to the following embodiments and accompanying drawings.

FIG. 3A is a schematic diagram of the assembled electronic device in FIG. 2;

FIG. 3B is an schematic diagram showing the electronic device in FIG. 3A in an operating state;

DETAILED DESCRIPTION OF THE EMBODIMENTS

Figure 1:
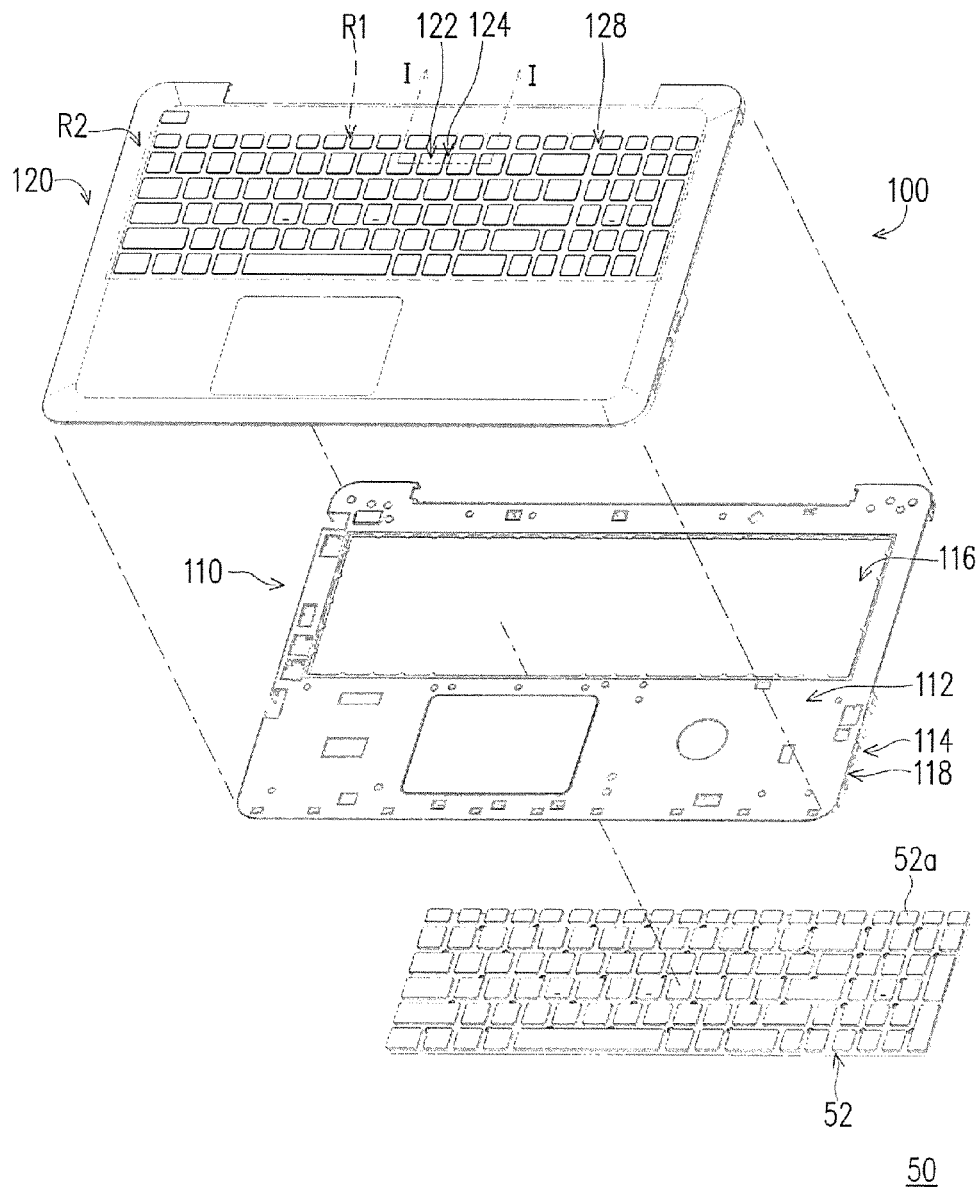
FIG. 1 is an exploded view of an electronic device in an embodiment.
Figure 2:
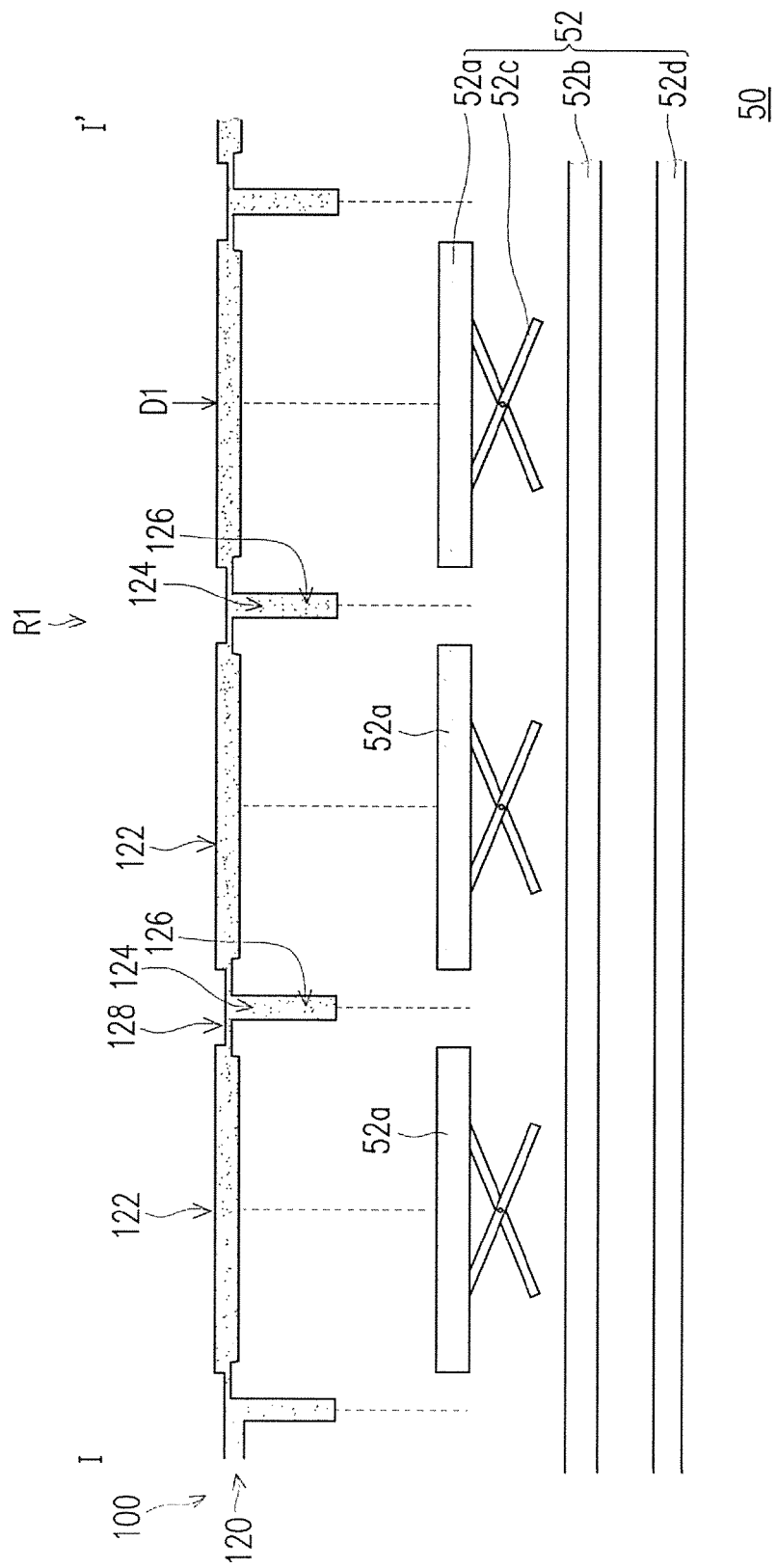
FIG. 2 is a section view of the electronic device in FIG. 1 along a line I-F.

FIG. 1 is an exploded view of an electronic device in an embodiment. FIG. 2 is a section view of the electronic device in FIG. 1 along a line I-F. FIG. 3A is a schematic diagram of the assembled electronic device in FIG. 2. FIG. 3B is a schematic diagram showing the electronic device in FIG. 3A in an operating state. Some components in FIG. 1 are omitted in FIG. 2 to FIG. 3B for clarity.

Referring to FIG. 1 to FIG. 3B, in the embodiment, the electronic device 50 is a notebook or a tablet PC, which is not limited herein. The electronic device 50 includes a waterproof housing 100 and a keyboard module 52. In an embodiment, the electronic device 50 further includes electronic components (not shown) according to requirements, such as a controller, a circuit broad, a battery, a touchpad, which is not limited herein. These electronic components and the keyboard module 52 are disposed between the bottom cover (not shown) and the waterproof housing 100. In other words, the waterproof housing 100 is assembled with the bottom cover together to accommodate the keyboard module 52 and the above-mentioned electronic components.

In the embodiment, the waterproof housing 100 includes a frame structure 110 and a waterproof structure 120. In an embodiment, the waterproof structure 120 is formed by means of injection molding or extrusion molding. The waterproof structure 120 covers the whole external surface of the frame structure 110 to form an outer surface of the waterproof housing 100.

In an embodiment, the frame structure 110 has a top surface 112, a plurality of side surfaces 114, an opening 116 is formed at the top surface 112 and a side surface 114 has a connecting unit 118. The side surfaces 114 surround the top surface 112. The opening 116 on the top surface 112 is used for accommodating the keyboard module 52 or other electronic elements such as a touchpad. The waterproof structure 120 covers the top surface 112 and extends to the side surfaces 114. Except the connecting unit 118 at the side surface 114, the whole of the external surface of the frame structure 110 (including the top surface 112, the side surfaces 114 and the opening 116) is covered. The connecting unit 118 is exposed for connecting with other external devices. In this way, the waterproof structure 120 of the waterproof housing 100 prevents contaminates fell into the electronic device 50.

In the embodiment, the keyboard module 52 is covered by the waterproof housing 100 and fits into the opening 116 of the frame structure 110. In an embodiment, the keyboard module 52 is mounted to the opening 116 from a side opposite to the top surface 112 of the frame structure 110. The waterproof structure 120 covers the keyboard module 52 that disposed in the opening 116. The key of the keyboard module 52 is enabled by a press on a position of the waterproof structure 120 corresponding to the key.

In the embodiment, the waterproof structure 120 includes an operating portion R1 and a fixing portion R2 that defined at the peripheral portion to the operating portion R1. In FIG. 1, one operating portion R1 and one fixing portion R2 are shown, and the number and the position of the operating portion R1 and the fixing portion R2 are not limited herein. The waterproof structure 120 is fixed to the external surface of the frame structure 110 (including the top surface 112 and the side surfaces 114) by the fixing portion R2, the operating portion R1 corresponds to the opening 116 and the keyboard module 52 in the opening. Thus, the operating portion R1 moves toward the opening 116 and presses the keyboard module 52 after the operating portion R1 is pressed.

The fixing portion R2 of the waterproof structure 120, except the operating portion R1 corresponding to the waterproof structure 120, is fixed to the frame structure 110 closely. The operating portion R1 corresponding to the opening 116 is not firmly fixed on the frame structure 110. As a result, when the operating portion R1 is under operated, it is operated corresponding to the keyboard module 52 under the operating portion R1. Therefore, the keyboard module 52 is operated on the operating portion R1 of the waterproof structure 120.

In the embodiment, the frame structure 110 is made of metal or plastic, and the waterproof structure 120 is made of rubber or silicone, which is not limited herein. In embodiments, the waterproof structure 120 is fixed on the frame structure 110 in different ways. In an embodiment, the frame structure 110 is formed by an injection molding method and then put into a mold, and the waterproof structure 120 is formed on the frame structure 110 by means of an in-mold forming process. In another embodiment, the frame structure 110 and the waterproof structure 120 are made separately and then fixed together via a gluing process. However, the way of fixing the frame structure 110 and the waterproof structure 120 is varies, which is not limited herein.

Figure 4:
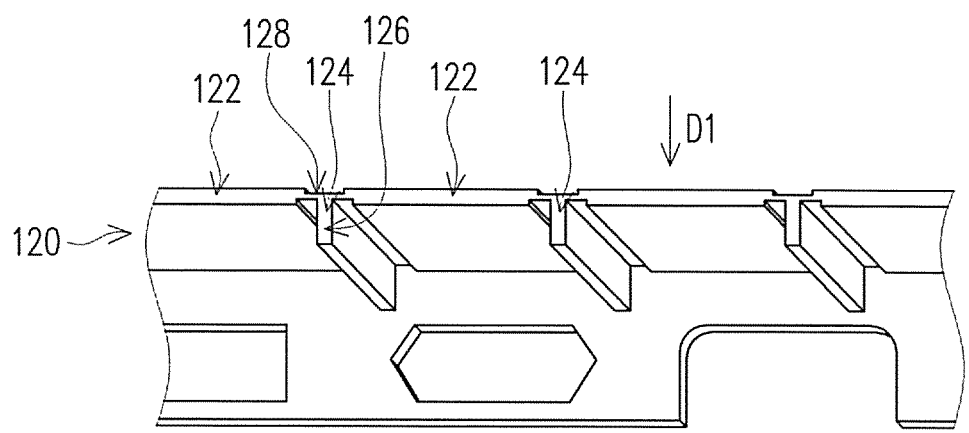
FIG. 4 is a schematic diagram showing the waterproof structure in FIG. 1.

FIG. 4 is a schematic diagram showing the waterproof structure in FIG. 1. Referring to FIG. 1 to FIG. 4, in the embodiment, the operating portion R1 of the waterproof structure 120 is individually fixed onto the keyboard module 52, and then the operating portion R1 would not deform greatly when pressed. The keyboard module 52 in the embodiment includes a plurality of keys 52a arranged separately. The keyboard module 52 further includes a keyboard frame 52b, scissor structures 52c, a baseplate 52d and other components such as a switch and a thin film circuit, which is not limited herein. In the embodiment, the keys 52a are disposed on the top of the keyboard module 52 and contacted with the waterproof structure 120. The keys 52a and the scissor structures 52c are assembled together, and the keyboard frame 52b has an accommodation region (not shown, such as an opening) used for allowing the keys 52a and the scissor structures 52c to pass through, and the accommodation region is also used for separating each key 52a and the corresponding scissor structure 52c from another.

Moreover, in the embodiment, the waterproof structure 120 includes a plurality of ribs 126 extending into the opening 116 and then located in the opening 116. The waterproof structure 120 is fixed to the keys 52a via the ribs 126. In one embodiment, the waterproof structure 120 is fixed on the keyboard frame 52b or the baseplate 52d of the keyboard module 52, and the rib 126 is located between the keys 52a. In this way, when a user presses a region of the waterproof structure 120 corresponding to the keys 52a, the keys 52a move relative to the keyboard frame 52b and the baseplate 52d via the scissor structures 52c while the ribs 126 are located around the keys 52a. Therefore, when the waterproof structure 120 is pressed to make the region corresponding to the keys 52a move relative to the opening 116, other regions of the waterproof structure 120, except the pressed part, would not be deformed with the separation of the ribs 126.

The waterproof structure 120 covers the keys 52a, the keys 52a are pressed while operation through the waterproof structure 120. In the embodiment, the shape of the operating portion R1 of the waterproof structure 120 corresponds to that of the keyboard module 52. That is, the waterproof structure 120 in the embodiment includes a plurality of movable portions 122 and a plurality of positioning portions 124 for separating the movable portions 122. The positioning portions 124 and the movable portions 122 are disposed in the operating portion R1. The ribs 126 extend from the positioning portions 124 toward the opening 116, respectively, and the ribs 126 protrude toward a direction parallel to the moving direction (direction D1 in the FIG. 2 to FIG. 4) of the movable portions 122 after pressed. Consequently, the positioning portions 124 are fixed at the keyboard module 52 via the ribs 126 and located between the keys 52a. Thus, the positioning portions 124 are connected with the keyboard module 52 via the ribs 126a and located between the keys 52a. For example, the positioning portions 124 are fixed on the keyboard frame 52b or baseplate 52d, and the movable portions 122 correspond to the keys 52a, respectively. In an embodiment, the positioning portion 124 in the operating portion R1 of the waterproof structure 120 is fixed on the keyboard module 52 (for example, by double-sided adhesive) and located between two adjacent keys 52a. Each of the movable portions 122 of the operating portion R1 corresponds to each of the keys 52a of the keyboard module 52 respectively. Each of the moveable portions 122 is surrounded and supported by the ribs 126 corresponding to the positioning portions 124. Consequently, when one of the movable portions 122 in the operating portion R1 is pressed, the movable portion 122 moves toward the opening 116 to trigger the corresponding key 52.

In the embodiment, an accommodation space for holding the corresponding key 52a is formed by any two adjacent ribs 126 and the movable portion 122 between the adjacent ribs 126. When the movable portion 122 moves toward the opening 116 and triggers the corresponding key 52a (as shown in FIG. 3A to FIG. 3B) after the movable portion 122 is pressed, the movable portion 122 is supported by the two adjacent ribs 126 and restricted to move along a direction D1 (as indicated by the arrow in FIG. 3B). At the time, since the ribs 126 are fixed, the region outside the ribs 126 (that is, the area that is not pressed of the movable portion 122) is not deformed. That is, when one of the movable portions 122 is pressed to trigger the corresponding key 52a, the movable portion 122 is deformed along direction D1 and would not trigger other keys due to the separation of the ribs 126. As a result, only the movable portion 122, which is pressed, in the operating portion R1 of the waterproof structure 120 is deformed.

In the embodiment described above, the movable portions 122 of the waterproof structure 120 corresponding to the keys 52a are not adhesive to the keys 52a. In another embodiment, the movable portions 122 are stick on the keys 52a. In an embodiment, the movable portions 122 and the keyboard module 52 are adhesive together by double-sided adhesive. In an embodiment, an adhesive is applied to the waterproof structure 120, such that the movable portions 122 made of rubber are more close to the keyboard module 52.

The way of fixing the waterproof structure 120 to the keyboard module 52 is varies according to requirements. In other words, regardless of whether the movable portions 122 are fixed on the keys 52a or not, the keys 52a are triggered when the corresponding movable portions 122 of the waterproof structure 120 are pressed. The positioning portions 124 of the waterproof structures 120 are fixed on the keyboard frame 52b or the baseplate 52d of the keyboard module 52 via the ribs 126, and thus the movable portions 122 that separated by the ribs avoids the deformation of other regions except the pressed movable portions 122.

In the embodiment, the operating portion R1 of the waterproof structure 120 is almost flat, and grooves 128 are formed at the surface of the operating portion R1. The groove 128 corresponds to the positioning portion 124 and defines the movable portions 122 corresponding to each key 52a of the keyboard module 52. In an embodiment, symbols/patterns (not shown) are formed on the movable portions 122 corresponding to each of the keys 52a. In an embodiment, the movable portions 122 are transparent to show the symbols/patterns of the keys 52a. Except the visual symbols/patterns, the grooves 128 on the operating portion R1 can be identified by fingers of users to know the arrangement of each key 52a in the operating portion R1.

Figure 5A:
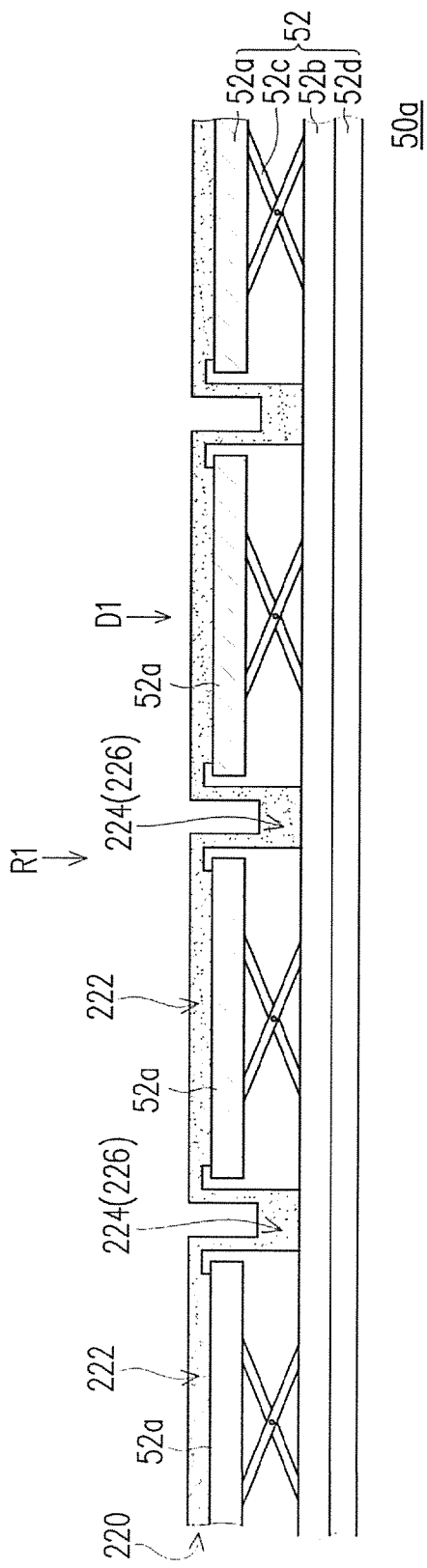
FIG. 5A is an assembly diagram of an electronic device in an embodiment.
Figure 5B:
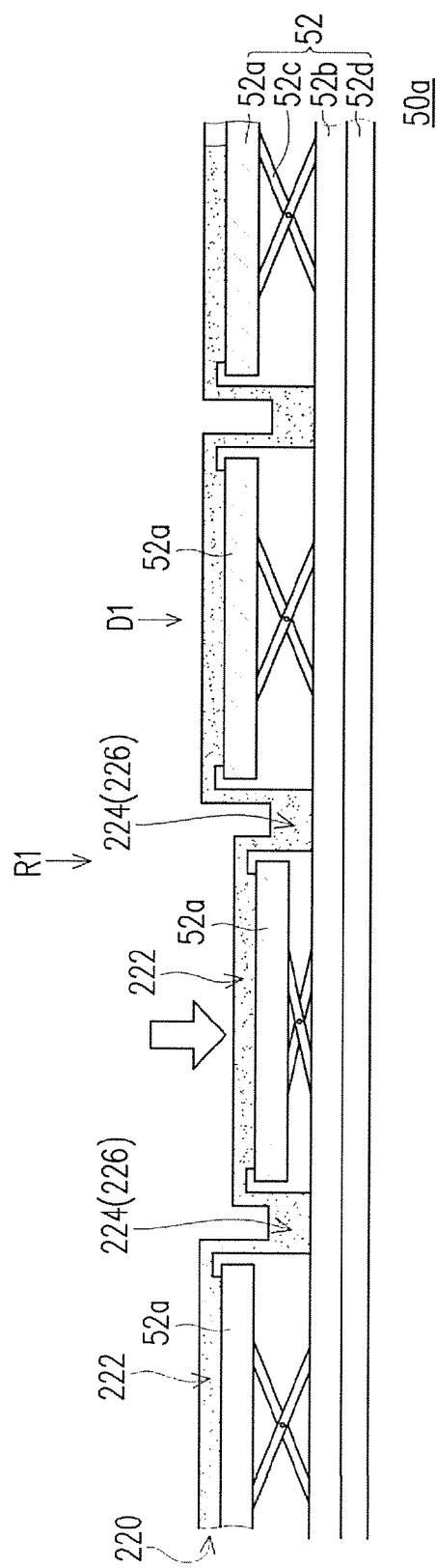
FIG. 5B is a schematic diagram showing the electronic device in FIG. 5A in an operating state.

FIG. 5A is an assembly diagram of an electronic device according to an embodiment. FIG. 5B is a schematic diagram showing the electronic device in FIG. 5A under operation. Referring to FIG. 5A and FIG. 5B, in the embodiment, the structure of the electronic device 50a is similar to the electronic device 50 shown in FIG. 1, the detailed structure of the electronic 50a is omitted herein for a concise purpose. In the embodiment, the waterproof structure 220 of the electronic device 50a includes movable portions 222 and positioning portions 224 in the operating portion R1. The movable portions 222 of the waterproof structure 220 are cap-shaped, and the keys 52a are received in the movable portions 222, respectively. The positioning portions 224 extend from the corresponding movable portions 222 to the keyboard module 52 to form the ribs 226. The positioning portions 224 are fixed on the keyboard frame 52b or baseplate 52d of the keyboard module 52 via the ribs 226.

In other words, the periphery of the movable portions 222 extends downwards to connect with the positioning portions 224, such that an accommodation space is formed to hold the corresponding key 52a, the scissor structures 52c or other components that not shown, such as a trigger switch, which is not limited herein. The positioning portion 224 extends from the corresponding movable portion 222 to the keyboard module 52 to form the rib 226. The positioning portions 224 is further fixed on the keyboard frame 52b or the baseplate 52d via the ribs 226, and the positioning portion 224 is located between two adjacent keys 52a, which is not limited herein.

The cap-shaped movable portion 222 holds the corresponding key 52a in the accommodation space, and the operating portion R1 of the waterproof structure 120 have a protruding appearance similar to a common keyboard module. In an embodiment, symbols/patterns (not shown) are formed on the movable portions 222 for the keys 52a. In an embodiment, the movable portions 222 are transparent to show the symbols/patterns of the keys 52a. Except the visual symbols/patterns, the movable portions 222 can be identified by fingers of users to know the arrangement of each key 52a in the operation portion R1.

When the movable portion 222 deforms toward the opening 116 (as shown in FIG. 1) and triggers the corresponding key 52a (as shown in FIG. 5A to FIG. 5B) while pressed, the movable portion 222 is supported by two adjacent ribs 226 and restricted deformed area along a direction D1 (as indicated by the arrow in FIG. 5B). At the time, the region outside of the ribs 226 (that is, the area out of the pressed movable portions 222) is not deformed. That is, when one of the movable portions 222 is pressed to trigger the corresponding key 52a, the movement of the movable portion 222 along direction D1 would not deform other regions due to the ribs 226. As a result, the whole waterproof structure 220 is not easily deformed.

In an embodiment, the waterproof structure and the operating portion do not have grooves, symbols/patterns are formed on the movable portions for the keys. In an embodiment, the movable portions are transparent to show the symbols/patterns on the keys 52a, which is not limited herein.

In sum, the waterproof housing with a waterproof function includes a waterproof structure and a frame structure, which are integratedly formed with each other as a seamless waterproof housing. The waterproof housing is an outermost component of an electronic device, which prevents liquids or other contaminates from entering into the electronic device. Furthermore, the waterproof structure includes a plurality of ribs extending toward and located in the opening correspondingly. Thus, when the waterproof housing and keyboard module are assembled together, the waterproof structure is fixed on the keyboard module via each of the ribs located between two adjacent keys to separate the keys. In this way, due to the separation by the ribs, the movable portions are pressed and deforms independently without the interference to each other, and the configuration of the waterproof structure would not affect the operation of the keyboard module. Consequently, the electronic device and the waterproof housing thereof have a good water-proof function and are convenient in use.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic device, comprising:
   a waterproof housing including:
      a frame structure including an opening; and
      a waterproof structure configured to fix on the frame structure, including a plurality of ribs, an operating portion and a fixing portion peripheral to the operating portion; and a keyboard module including a plurality of keys, wherein the keyboard module is disposed under the waterproof housing and passes into the opening from an underside of the frame structure, the waterproof structure covers the keyboard module disposed in the opening and is fixed between the keys via the ribs, wherein the operating portion further includes a plurality of movable portions and a plurality of positioning portions for separating the movable portions, the ribs extend from the positioning portions toward the opening correspondingly, the positioning portions are fixed on the keyboard module via the ribs and located between the keys, the movable portions correspond to the keys, respectively, the movable portion moves toward the opening when the movable portion is pressed.

2. The electronic device according to claim 1, wherein the waterproof structure is fixed on the whole of the external surface of the frame structure via the fixing portion, the operating portion corresponds to the opening and the keyboard module.

3. The electronic device according to claim 1, wherein the ribs protrude toward a direction parallel to a moving direction of the movable portions when the movable portions are pressed.

4. The electronic device according to claim 1, wherein the operating portion of the waterproof structure is flat, and the movable portions are distinguishable.

5. The electronic device according to claim 1, wherein the movable portions of the waterproof structure are cap-shaped, and the keys are held in the movable portions, respectively.

6. The electronic device according to claim 1, wherein the frame structure includes a top surface and a plurality of side surfaces, the waterproof structure covers the top surface and extends to the side surfaces to cover the whole of the external surface of the frame structure.

* * * * *